United States Patent

Croyle et al.

[15] 3,692,208
[45] Sept. 19, 1972

[54] CLOSURE FOR OPEN-MOUTHED CONTAINERS OR TUBULAR VESSELS

[72] Inventors: Jack V. Croyle, Woonsocket; James B. Swett, Barrington, both of R.I.

[73] Assignee: Dart Industries Inc., Los Angeles, Calif.

[22] Filed: June 22, 1970

[21] Appl. No.: 48,404

[52] U.S. Cl.................220/24.5, 220/42 C, 220/60 A
[51] Int. Cl................................................B65d 39/12
[58] Field of Search........220/42 B, 42 C, 42 D, 60 R, 220/24.5, 59; 150/.5

[56] References Cited

UNITED STATES PATENTS

| | | | |
|---|---|---|---|
| 2,771,205 | 11/1956 | Zepelovitch | 220/24.5 X |
| 3,111,240 | 11/1963 | Whitton, Jr. | 220/60 R X |
| 2,687,228 | 8/1954 | Knocke | 220/24.5 |
| 2,024,495 | 12/1935 | Wolfe | 220/24.5 UX |
| 2,449,645 | 9/1948 | Du Pont et al. | 220/24.5 X |
| 3,023,926 | 3/1962 | Wilke | 220/60 R |
| 3,159,305 | 12/1964 | Fischbach | 220/60 R |

FOREIGN PATENTS OR APPLICATIONS 624,642   11/1962   Belgium....................220/60 R

*Primary Examiner*—Joseph R. Leclair
*Assistant Examiner*—James R. Garrett
*Attorney*—Leigh B. Taylor, Paul R. Wylie and Harold R. Beck

[57] ABSTRACT

A closure suitable for insertion over the opening of a tubular or similarly constructed member and adapted to hermetically seal that opening. The closure construction includes a central wall having a toroidally shaped annular portion that is joined to a substantially planar center portion and sealing member, which annular portion peculiarly adapts it for placement upon the tubular member by the application of pressure to the approximate center of the central wall.

4 Claims, 4 Drawing Figures

INVENTOR.
JACK V. CROYLE
JAMES B. SWETT

BY *Leigh B. Taylor*
ATTORNEY 3,692,208

CLOSURE FOR OPEN-MOUTHED CONTAINERS OR TUBULAR VESSELS

This invention relates generally to closures, but more specifically to a type of finger-operable seals for containers.

Heretofore sealing closures for containers have been fabricated from materials having the required characteristics of strength, elasticity and flexibility, including closures made of compressed fiber, paper, cellulosue stock, plastic materials, and condensation products either by themselves or in various combinations.

The invention herein provides a sealing closure for containers in the form of a hollow stopper having the elasticity and flexibility to provide either a non-snapping noiseless or snap-on type of cover which is applicable to the lip of a container or by hand or machine and removable therefrom by a peeling-off type of procedure.

More particularly, the invention concerns reusable plastic container closures for open-mouthed containers and further contemplates a closure arrangement and sealing method that is quickly and easily effectable and which assures a lasting reliable hermetic seal. A further feature of the invention resides in the provision of a sealing closure of the above characteristics which may be molded by compression or injection and which is economical to manufacture.

This new closure also includes several particular distinctive constructional features which enhance its applicability for use on containers and other related tubular members. Among these is the concavo-conex central wall including an annular toroidally shaped portion that facilitates the contraction of the central wall peripheral edge so that that wall area can easily enter the vessel and thereafter expands to seal against the vessel walls.

With the foregoing features in mind and with such other features as will become more apparent as this Specification proceeds, the invention will be understood from the following description taken in conjunction with the accompanying drawings, wherein like characters of reference are used to designate like parts, and wherein.

Figure 1:
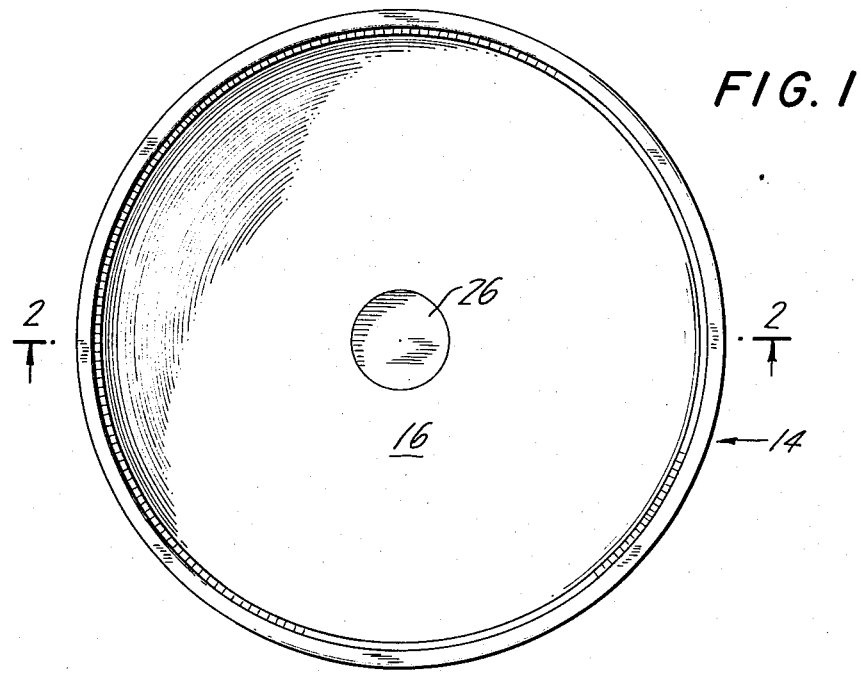
FIG. 1 is a top view of a closure incorporating the characteristic features of this invention.
Figure 2:
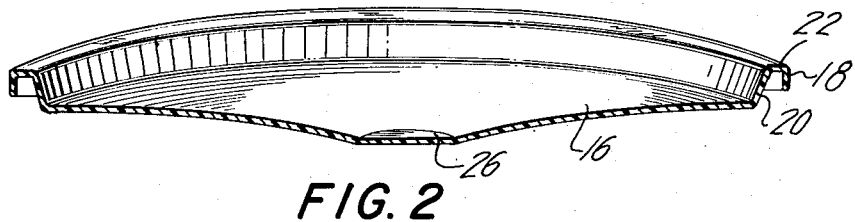
FIG. 2 is a perspective sectional view of the closure taken along lines 2—2 in FIG. 1.

In the drawings number 10 represents conventional container shown with conical side walls terminating in a peripheral rim 11. A similar container is indicated by numeral 12. Wherein the inner walls of the containers at the rim portions are provided with an annular bead 13.

Containers 10 and 12 may be of any shape and of any flexible or distortable and stiff material such as plastic, glass or metal. In the use of a flexible or distortable material, the closure hereinafter to be described is afforded to live resistance to effect a seal whereas in the use of a stiff material a seal is effected between the engaging walls of the closure imposing opposite pressures against the walls of the container to effect a seal.

A closure generally designated by numeral 14 has a central toroidally shaped wall 16 and an upwardly directed and inverted U-shape annular groove extending from the periphery thereof. The outer side wall 18 defines the groove but terminates above the inner side wall 20 while a top wall or connecting wall 22 joins the side walls.

Particular notice should be taken of the fact that the inverted U-shape groove formed by walls 18, 20, and 22 is of a width such that wall 18 will not interfere with rim 11 as the closure is applied to the vessel opening. Of course wall 18 may also be eliminated or its shape so modified that interference with rim 11 is substantially negated as it affects insertion of the central wall 16 into the opening. Similarly, note that in the FIG. 3 embodiment, an annular bead 24 is positioned on the sealing side of wall 20. This bead 24 is adapted to snap over bead 13 on container 12 as the closure is inserted thereon and to effect a seal around the inner wall of container 12 below bead 13. Bead 13 thus functions as a stop member and partially restricts the upward movement of closure 14.

For the application of any of the closures to a container, the closure at the inverted groove is placed over the mouth or top edge of the container rim and the approximate center of central wall 16 is pressed down by the thumb or some other mechanical means to effect a contraction of the side groove wall 20. Thus, the locally distortable closure member is contractably and distensibly constructed so that the wall 20 will be displaceable with central wall 16. This function is achieved due to the resiliency and elastic memory of the materials of construction employed, and in particular because of the central wall configuration that is carefully constructed to take advantage of these inherent physical properties.

This configuration is of a toroidal disposition and extends outwardly from either a center point or a substantially planar area 26 such as may be seen in FIG. 1. Also as is readily apparent, the toroidally shaped annular portion 16 is concave downwardly and is integrally joined at its lowermost extent with area 26. Likewise, at its uppermost extent it is integrally joined with the generally upwardly extending wall 20. In essence, the central wall 16 because of its curvilinear construction, tends to collapse upon itself upon the application of pressure at the approximate center point thereof. This collapse substantially uniformly displaces the wall 20 inwardly. Theoretically, the entire central wall would continue to collapse in an umbrella-like fashion if it were not for the stiffness of that wall as well as the reinforcement provided by walls 18, 20 and 22.

Figure 3:
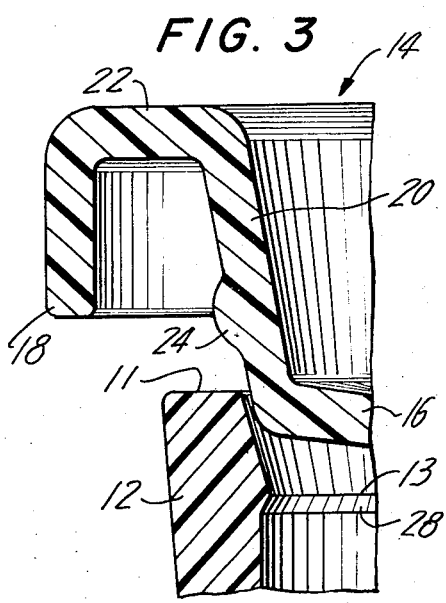
FIG. 3 is an enlarged sectional view showing a preferred embodiment of the sealing means around the closure periphery and one form of tubular opening adapted to receive that closure.

As indicated above, the closure embodiment depicted in FIG. 3 further includes an outwardly protruding bead 24 which extends around the outer periphery of side groove wall 20. FIG. 3 further shows an undercut or inverted ledge 28 below which the bead 24 is adapted to seal against the inner wall of the container 12.

The comparative distances between the inside surface of wall 22 in the U-shape groove and the bead 24 and between the top edge of rim 11 and undercut 28 are preferred to be such that the entirety of the bead will lie below and out of contact with the undercut when the container and closure are in sealed relationship. This then assures that actual sealing occurs between the bead 24 or the outside of wall 20 (FIG. 4) and the container side wall and not against the undercut 28.

The noted disparity in the respective dimensions between the inside surface of wall 22 and bead 24, and the top edge of rim 11 and undercut 28, tends to negate the necessity to retain exacting tolerances on them. For example, if a lasting seal were to be maintained between the bead and undercut, one would have to be assured that a virtual line contact was kept between these elements because of their respective contoured features. In this disclosed arrangement, however, it is only necessary to maintain the bead 24 below the undercut 28 in a manner so that sealing occurs against a virtually flat wall surface.

The undercut 28 and beads 13 and 24 therefore function to produce an audible indication of when the closure slips into proper sealing engagement with the container, and further tend to restrain the closure upon the open mouth of the container as indicated above. In this respect, it should be noted that the undercut 28 may be either continuous or discontinuous to produce the desired effect, and that the undercut and bead may be reversed in their placement on the container and closure respectively if desired.

Figure 4:
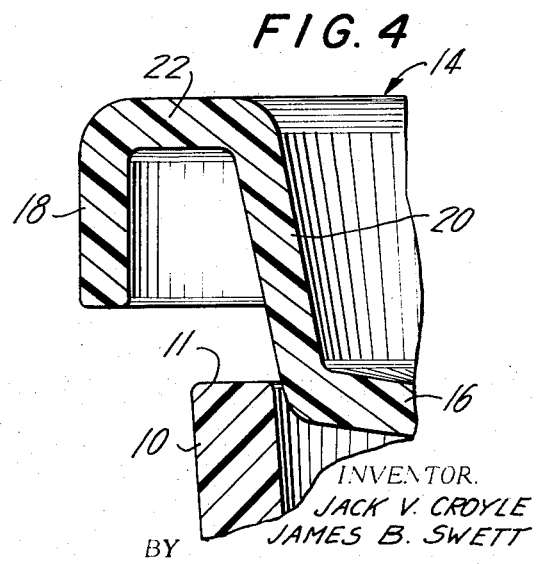
FIG. 4 is another enlarged sectional view similar to that shown in FIG. 3 and also representing a preferred construction.

In addition, and as is evident from FIG. 4, the undercut 28 need not be employed as shown in the preferred embodiment. For example, the rim 11 of a typical tubular member or container 10 need not be undercut and bead 24 may be eliminated in certain instances without impairing the operability of the inventive closure.

For the removal of one of the closures from a container, the closure side wall 18 is grasped between the thumb and a finger and easily and expeditiously peeled off from the rim 11 of the container in a silent and non-snapping manner.

The closure, and the container if made of glass or of a material of similar characteristics as the closure material may be used in the packaging of alcoholic liquids, carbonated beverages, fruits, preserves, milk and derivative products, cheese, candies, other foods and beverages and also for proprietary preparations chemicals etc.

The closures above described may be formed by compression injection, or other molding techniques and as indicated the qualities of the closure structure are enhanced by the characteristics of the materials of construction. These characteristics comprise preferably a rubber-like thermoplastic composition which does not absorb and is not readily wetted by water; is odorless and resistant to acids, alkalis, solvents and other chemicals at ordinary temperatures; will not soften far below boiling point of water; is resistant to mildews, micro-organisms and insects; has flexibility and elasticity with a slow recovery and is frictional and waxy to the touch. Such a closure material comprises the polymers of ethylene known under the trade names "Polythene" and "Polyethylene."

The invention has been described in detail with particular reference to preferred embodiment thereof, but it will be understood that variations and modifications can be effected within the spirit and scope of the invention as described herein above and as defined in the appended claims.

We claim:

1. A locally distortable plastic closure contractably and distensibly constructed and having an elastic memory such that it is adapted to hermetically seal an openmouth member and comprising; a central wall having a substantially planar center portion and a toroidally shaped annular portion that is concave downwardly ad is integrally joined at its lowermost extent with said center portion and is integrally joined at its uppermost extent with a generally upwardly extending wall, said center portion being adapted for the application of pressure to the approximate center thereof in such a manner that said central wall tends to collapse upon itself and substantially uniformly displace said upwardly extending wall radially inwardly until said closure is easily positionable on an open-mouthed member.

2. A plastic closure according to claim 1 wherein said upwardly extending wall is an extended sealing means positioned around said central wall and is displaceable such that at least a portion thereof is closely engageable with and sealable against the walls of an open-mouthed member due to the resiliency and elastic memory of said closure upon the discontinuance of applied pressure to said center portion.

3. A locally distortable injection molded thermoplastic closure contractably and distensibly constructed and having an elastic memory such that it is adapted to hermetically seal an open-mouthed member and comprising:

a. a central wall having a substantially planar center portion and a toroidally shaped annular portion that is concave downwardly and is integrally joined at its lowermost extent with said center portion and is integrally joined at its uppermost extent with a generally upwardly extending wall, said central wall being adapted for the application of pressure to the approximate center thereof in such a manner that said toroidally shaped portion tends to collapse upon itself and substantially uniformly displace said upwardly extending wall radially inwardly until said closure is easily positionable on an open-mouthed member; and, b. integral extended sealing means positioned around said upwardly extending wall, said sealing means being displaceable in like manner with said upwardly extending wall such that at least a portion of said sealing means is closely engageable with and sealable against the walls of an open-mouthed member due to the resiliency and elastic memory of said closure upon the discontinuance of applied pressure to said central wall.

4. In combination, a substantially rigid open-mouthed container having a peripheral rim, a substantially rigid closure member thereof having a central wall and a raised peripheral rim member including an inner wall, an outer wall, and a connecting top wall, the groove between said inner and outer walls serving to removably and frictionally engage said peripheral rim, said central wall including a toroidally shaped annular portion that is concave downwardly and is integrally joined at its lowermost extent with a substantially planar center portion and is integrally joined at its uppermost extent with said inner wall so that the application of pressure at the approximate center thereof tends to uniformly displace said inner wall radially inwardly enabling its entry into said open-mouthed member for sealing engagement therewith and said outer wall being disposed a distance from said inner wall such that upon displacement of said inner wall, it will pass over said peripheral rim without substantially interfering therewith.

* * * * *